United States Patent [19]
Okamoto

[11] Patent Number: 4,709,335
[45] Date of Patent: Nov. 24, 1987

[54] ELECTRONIC GOVERNOR FOR INTERNAL COMBUSTION ENGINES

[75] Inventor: Kenji Okamoto, Higashimatsuyama, Japan

[73] Assignee: Diesel Kiki Co., Ltd., Japan

[21] Appl. No.: 711,240

[22] Filed: Mar. 13, 1985

[30] Foreign Application Priority Data

Mar. 12, 1984 [JP] Japan .................................. 59-45651

[51] Int. Cl.$^4$ ............................................. F02M 39/00
[52] U.S. Cl. .......................... 364/431.05; 364/431.07; 364/426; 123/352; 123/357
[58] Field of Search ...................... 364/431.05, 431.07, 364/426; 123/352, 357, 358

[56] References Cited
U.S. PATENT DOCUMENTS

| | | | |
|---|---|---|---|
| 3,886,915 | 6/1975 | Taplin | 123/357 |
| 4,422,420 | 12/1983 | Croman et al. | 123/352 |
| 4,541,052 | 9/1985 | McCulloch | 364/431.07 |
| 4,566,414 | 1/1986 | Sieber | 123/357 |
| 4,589,391 | 5/1986 | Sieber et al. | 123/357 |
| 4,591,986 | 5/1986 | Nakajima | 364/426 |

Primary Examiner—Parshotam S. Lall
Attorney, Agent, or Firm—Guy W. Shoup

[57] ABSTRACT

In an electronic governor for controlling an internal combustion engine in accordance with the operation of an accelerator pedal or a speed setting member, the governor mode for controlling the speed of the engine is automatically switched over between a first governor characteristic based on a first signal relating to the operation of the accelerator pedal or a second governor characteristic based on a second signal relating to the operation of the speed setting member, the switch-over being made in response to the condition of the second signal.

10 Claims, 6 Drawing Figures

ELECTRONIC GOVERNOR FOR INTERNAL COMBUSTION ENGINES

BACKGROUND OF THE INVENTION

The present invention relates to an electronic governor for internal combustion engines, and more particularly to an electronic governor for electronically controlling the adjustment of the amount of fuel injected by a fuel injection pump for an internal combustion engine.

In general, governor speed characteristics for internal combustion engines are classified into two types: the all-speed governor characteristic in which the governing operation is carried out for the entire speed range from idling speed to maximum engine speed and the minimum-maximum governor speed characteristic in which the governing operation is carried out for the maximum speed state and the idling speed state of the engine and no governing operation is effected in the medium engine speed range therebetween. The former characteristic is suitable for the case where the engine should be operated at a specific constant speed, as in the case of electric generators, hydraulic equipment, machines for construction and civil engineering work, and the like (called simply "machines" hereinafter), and the latter characteristic is suitable for a vehicle whose speed is controlled in accordance with the operation of an accelerator pedal depending upon the load or road condition.

Therefore, in the case where a single internal combustion engine is used both for driving the vehicle and for operating a machine, as in the case of a vehicle equipped with a machine, it is desirable to provide an arrangement for switching over the governor characteristic.

In the prior art, an apparatus capable of switching over the governor characteristic is disclosed in Japanese Patent Application Disclosure No. Sho 56-148635. The disclosed electronic governor has a control signal pattern generator for the all-speed range and another control signal pattern generator only for high speed and low speed and the output of one or the other of these two control signal pattern generators is selectively derived by the operation of a snap switch.

However, since the disclosed apparatus is constituted in such a manner that the switch for changing the governor characteristic has to be operated by the operator, there is a danger that the governor characteristic may be changed to the other state by a misoperation while the engine is being controlled in the desired state. If this should happen, the engine speed will suddenly change, which may damage the equipment being operated (vehicle or machine) and in many cases will expose the operator to considerable danger. Furthermore, it is sometimes impossible to apply the disclosed apparatus to an existing piece of equipment for the lack of space on the control panel for the required switch.

SUMMARY OF THE INVENTION

It is an object of the present invention to provide an improved electronic governor for an internal combustion engine which is free from the drawbacks described above.

It is another object of the present invention to provide an electronic governor which can switch over the governor characteristic without the provision of a switch on the control panel, can preclude misoperation and is simple to use.

According to the present invention, in an electronic governor for electronically controlling the speed of an internal combustion engine in accordance with the operation of an accelerator pedal or a speed setting member, the electronic governor has means for producing a first signal relating to the amount of depression of the accelerator pedal, means for producing a second signal relating to the amount of operation of the speed setting member, a discriminating means for discriminating the level of the second signal, a producing means responsive to the discrimination by the discriminating means for calculating and outputting a first control signal for controlling the amount of fuel injected in accordance with a first governor characteristic on the basis of the first signal or a second control signal for controlling the amount of fuel injected in accordance with a second governor characteristic on the basis of the second signal, and an actuating means responsive to the output of the producing means for operating a fuel regulating member.

With this construction, since the switch-over of the governor characteristic is automatically carried out in accordance with the state of the second signal set by the speed setting member, erroneous switch-over from the proper governor characteristic to the other governor characteristic by a misoperation is surely prevented.

Therefore, for example, when the switch-over between the governor characteristic for vehicle operation and that for machine operation is automatically carried out in accordance with the state of the second signal, erroneous switch-over of the governor characteristic can be prevented, so that the safety of engine operation is greatly increased.

Furthermore, since no additional switch for changing the governor characteristic is needed on the control panel, the present invention can be easily applied to an existing piece of equipment.

The invention will be better understood and the other objects and advantages thereof will be more apparent from the following detailed description of a preferred embodiment with reference to the accompanying drawings.

DESCRIPTION OF THE PREFERRED EMBODIMENTS

Figure 1:
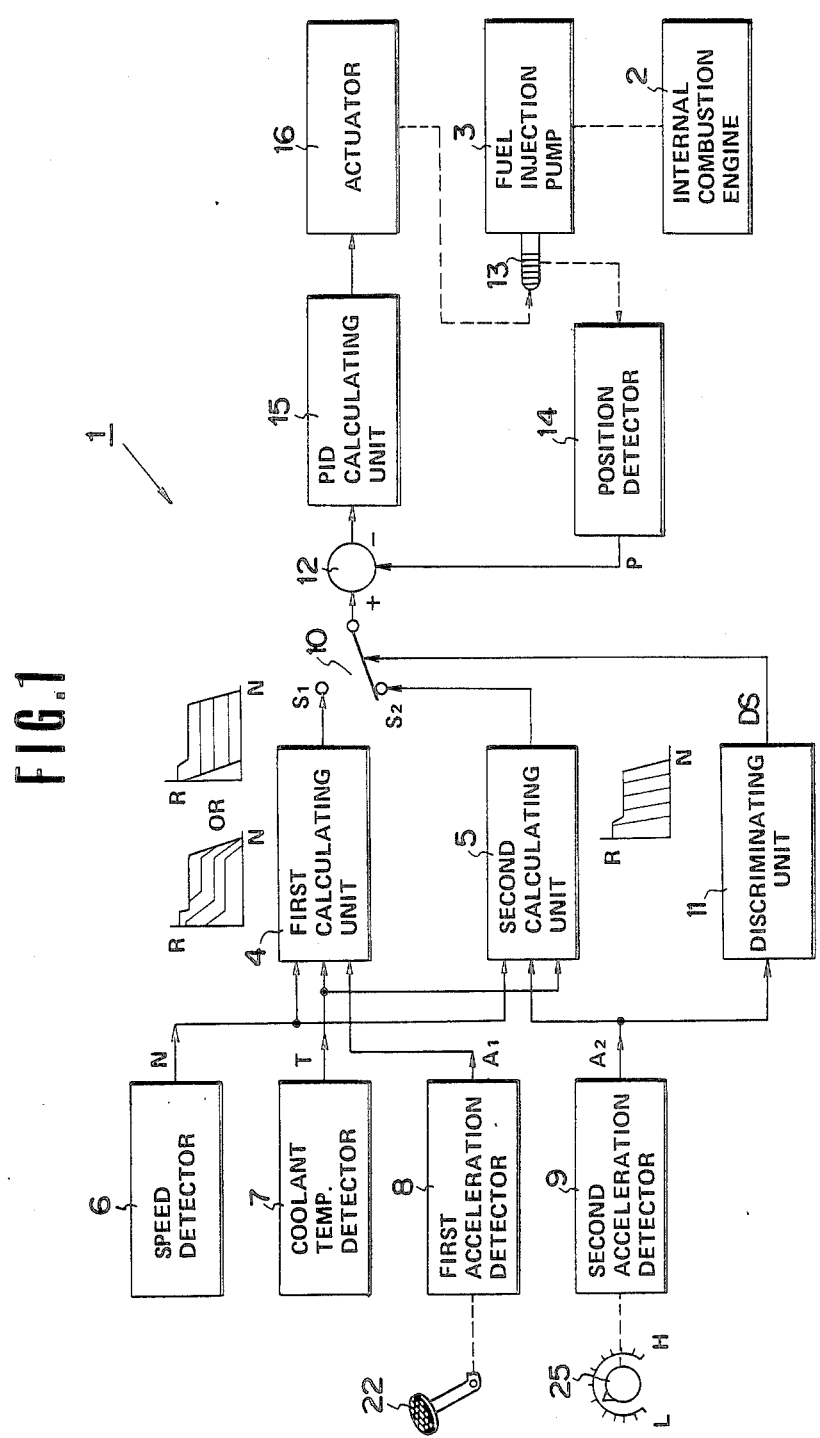
FIG. 1 is a block diagram of a first embodiment of the present invention.

FIG. 1 is a block diagram of an electronic governor 1 for controlling the amount of fuel injected from a fuel injection pump 3 to an associated internal engine 2 used for operating both a vehicle and a machine. In order to control the amount of fuel injected in accordance with a minimum-maximum speed governor characteristic when the internal combustion engine 2 is used for operating the vehicle and to control the amount of fuel injected in accordance with an all-speed governor characteristic when it is used for operating the machine, the electronic governor 1 has a first calculating unit 4 for carrying out the calculation for the governor control in accordance with the minimum-maximum speed governor characteristic and a second calculating unit 5 for carrying out the calculation for the governor control in accordance with the all-speed governor characteristic.

To the first calculating unit 4, there are applied a speed signal N showing the actual speed of the internal combustion engine 2, a temperature signal T showing the temperature of the engine coolant at each instant, and a first amount signal $A_1$ indicating the amount of depression of an accelerator pedal 22 from a speed detector 6, a coolant temperature detector 7 and a first acceleration detector 8, respectively. On the basis of these signals, the first calculating unit 4 produces a first control signal $S_1$ for controlling the engine speed in accordance with the minimum-maximum speed governor characteristic. To the second calculating unit 5, there are applied the signals N and T and also from a second acceleration detector 9 a second amount signal $A_2$ indicating the amount of operation of a speed setting knob 25 for setting the speed of a machine (not shown) powered by the internal combustion engine 2. (It should be noted that the speed setting knob 25 is not provided especially for the purpose of this invention but is a standard component on machines of the type to which this invention is applied.) In response to these input signals N, T and $A_2$, the second calculating unit 5 produces a second control signal $S_2$ for controlling the engine speed in accordance with the all-speed governor characteristic.

The first and second control signals $S_1$ and $S_2$ are applied to a selecting switch 10 which is switched to pass one or the other of the signals $S_1$ and $S_2$ in accordance with the discrimination by a discriminating unit 11.

The second signal $A_2$, which decreases in level as the knob 25 moves from L position to H position, is applied to the discriminating unit 11 from the second acceleration detector 9. The discriminating unit 11 discriminates which of the first and second control signals $S_1$ and $S_2$ is to be selected in accordance with the second amount signal $A_2$ and outputs an operating signal DS for operating the selecting switch 10 in accordance with the result of the discrimination. The discriminating operation may be carried out on the basis of whether or not the level of the second amount signal $A_2$ is more than a predetermined reference level. Consequently, when the speed setting knob 25 is moved away from the minimum position "L" to increase the amount of fuel injection for the purpose of operating the machine and as a result the level of the second amount signal $A_2$ becomes equal to or less than the predetermined level, the second control signal $S_2$ is selected by the selecting switch 10. On the other hand, when the speed setting knob 25 is set in such a way that the level of the second amount signal $A_2$ becomes equal to or greater than the predetermined reference level, the first control signal $S_1$ is selected by the selecting switch 10.

The control signal selected by the selecting switch 10 is applied to an adder 12 to which is also applied a position signal P from a position detector 14 for detecting the position of a fuel regulating member 13 of the fuel injection pump 3. These two input signals are added together in accordance with the signs indicated in FIG. 1, and the result of the adding operation is forwarded to a PID calculating unit 15.

Each of the first and second control signals $S_1$ and $S_2$ indicates a target position of the fuel regulating member 13, namely the position of the fuel regulating member 13 required obtaining the desired amount of fuel injection at that time. The signal output by the adder 12 thus represents the difference between the actual position and the target position of the fuel regulating member 13 and on the basis of this signal the PID calculating unit 15 produces a signal for reducing this difference to zero. The output from the PID calculating unit 15 is applied to an actuator 16 connected with the fuel regulating member 13, whereby control of the amount of fuel injection is carried out.

With this structure, when the electronic governor 1 is used for operating the vehicle, the speed setting knob 25 is so set that the level of the second amount signal $A_2$ is greater than the predetermined reference level, whereby the selecting switch 10 selects the first control signal $S_1$. In this mode, when the accelerator pedal 22 is operated, the speed of the engine 2 is controlled in accordance with the minimum-maximum speed governor characteristic, which is the proper characteristic for vehicle operations. On the other hand, when the engine 2 is used for running the machine, the speed setting knob 25 is set so that the level of the second amount signal $A_2$ becomes equal to or less than the predetermined reference level. Therefore, during operation of the machine, the second control signal $S_2$ is selected by the selecting switch 10. That is, when the operator operates the speed knob 25 for operation of the machine, the governor characteristic is automatically switched over to the all-speed governor characteristic.

In addition, after completion of the operation of the machine, when the speed setting knob 25 is returned to the minimum position "L", the governor characteristic is changed back to the minimum-maximum speed governor characteristic for operating the vehicle.

Next, the present invention will be described in more detail with reference to a second embodiment of the present invention shown in FIG. 2.

The electronic governor 21 shown in FIG. 2 has the same function as the electronic governor 1 and the portions corresponding to those shown in FIG. 1 are designated by the same reference numerals and no further explanation of these portions will be made here.

The first acceleration detector 8 has a potentiometer 23 connected with the accelerator pedal 22 and a voltage signal of a level corresponding to the amount of depression of the accelerator pedal 22 is produced as the first amount signal $A_1$ from the potentiometer 23. On the other hand, the second acceleration detector 9 includes a variable resistor 24 having a d.c. voltage V applied across its fixed terminals and the voltage signal derived from the slidable contact $24_a$ of the variable resistor 24 is derived as the second amount signal $A_2$. The speed setting knob 25 is connected to a rotating shaft (not shown) which is fixed to the slidable contact $24_a$ and a voltage signal of a level corresponding to the position of the knob 25 is produced as the second amount signal $A_2$.

Figure 3:
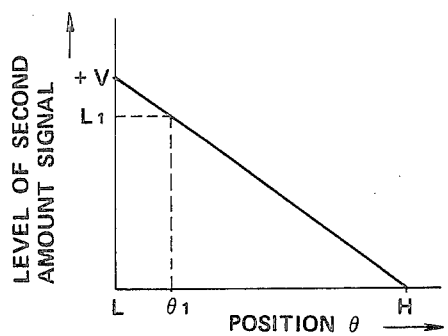
FIG. 3 is the charateristic curve of the signal from the second acceleration detector of FIG. 2.

FIG. 3 is a graph showing the change in the level of the second amount signal $A_2$ when the knob 25 is turned from the position "L" to the position "H". As in the electronic governor 1 in FIG. 1, the second amount signal $A_2$ is used as an acceleration signal for the operation of a machine and as a signal for commanding the switch-over of the governor characteristic. Namely, the governor characteristic of the electronic governor 21 is also switched over to the all-speed governor characteristic for operation of the machine and to the minimum-maximum speed governor characteristic for the operation of the vehicle. The switch-over of the governor characteristic is carried out by a microcomputer. More specifically, when the position $\theta$ of the knob 25 is less than $\theta_1$, in other words when the level of the second amount signal $A_2$ is more than the level $L_1$ corresponding to the position $\theta_1$, the speed of the diesel engine 28 is controlled on the basis of the first amount signal $S_1$ in accordance with the minimum-maximum speed governor characteristic. When the position $\theta$ of the knob 25 is not less than $\theta_1$, the speed of the diesel engine 28 is controlled on the basis of the second amount signal $A_2$ in accordance with the all-speed governor characteristic.

The control unit 26 performs a similar fuel amount calculation and difference signal generation as previously described for the second calculating unit 5 and adder 12 in FIG. 1.

In the control unit 26, the calculation for controlling the engine speed is carried out based on the governor characteristic selected in response to the second amount signal $A_2$, and the actuator 16 is driven in response to the control signal CS according to the result of the calculation by the control unit 26.

The position signal P from the position detector 14 is applied to the control unit 26 as a feedback signal, and the speed of the diesel engine 28 is controlled by a closed-loop control system including the feedback signal.

Figure 2:
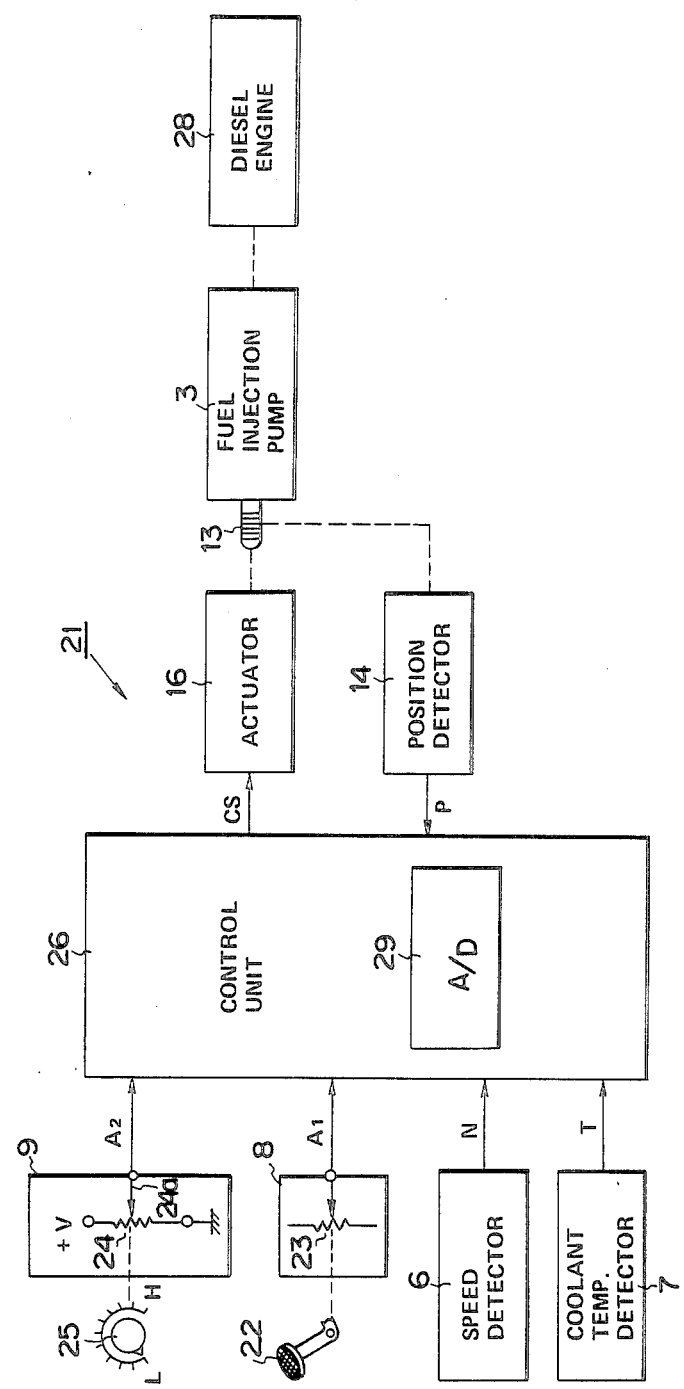
FIG. 2 is a block diagram of a second embodiment of the present invention.
Figure 4:
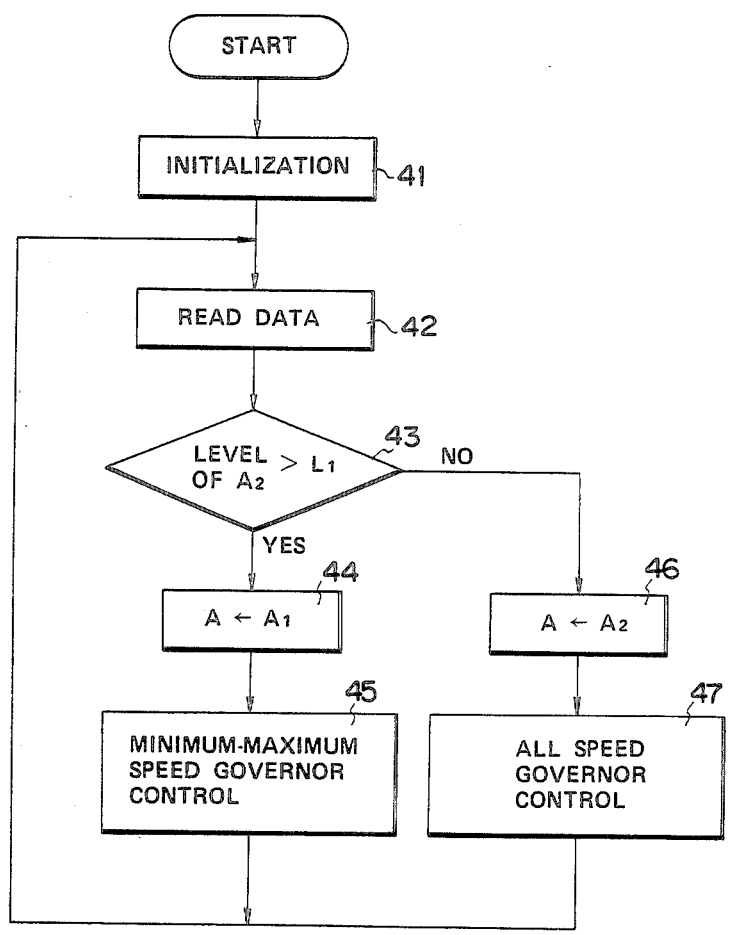
FIG. 4 is a flow chart showing the control program stored in the control unit of FIG. 2.

FIG. 4 is a flow chart of the program for speed control executed in the control unit 26 of FIG. 2.

At first, after the initialization is carried out in step 41, data obtained from an analog-digital converter 29 in control unit 26 in response to the signals $A_1$, $A_2$, N and T are read in step 42. Then, the operation moves to step 43 where a decision is made as to whether the level of the second amount signal $A_2$ is more than the level $L_1$. When the decision is YES in step 43, the operation advances to step 44 in which the first amount signal $A_1$ is applied as the acceleration data A to be used in a calculation in step 45. The operation then moves to step 45, wherein the calculation for engine speed control according to the minimum-maximum speed governor characteristic is carried out in response to data A and other required input data and the control signal CS is produced on the basis of the calculated result.

When the decision in step 43 is NO, the second amount signal $A_2$ is applied as the acceleration data A in step 46 and the calculation for engine speed control according to the all-speed governor characteristic is carried out in response to data A and other required input data to produce the control signal CS based on the calculated result (step 47).

As described above, depending upon the setting of the knob 25, either speed control operation based on the minimum-maximum speed governor characteristic in response to the first amount signal $A_1$ or speed control operation based on the all-speed governor characteristic in response to the second amount signal $A_2$ is carried out. Since the switch-over of the control characteristic is automatically carried out by the operation of the knob 25, there is no possible chance of the governor characteristic being erroneously switched over during operation of the vehicle so that high safety is assured. Furthermore, no additional switches for switching over the governor characteristic need be provided on the operation panel, so that there is no problem regarding finding space for such a switch.

In addition, so that the operator can clearly discriminate whether or not the level of the second amount signal $A_2$ is more than $L_1$, a click may be provided on the knob 25 at the position of $\theta = \theta_1$. With this arrangement, the operator will be able to feel a click sensation through his fingers when the position of the knob 25 passes through the position $\theta_1$.

Figure 5:
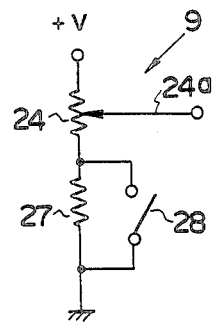
FIG. 5 is a circuit diagram showing another embodiment of the second acceleration detector.
Figure 6:
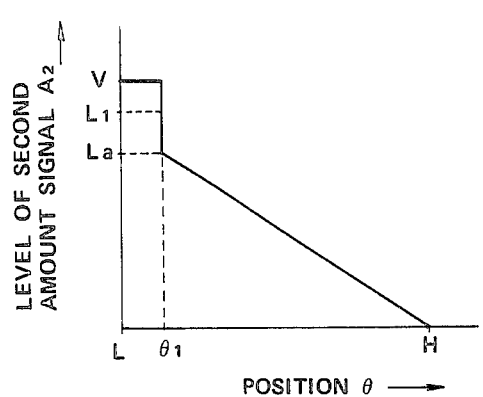
FIG. 6 is the characteristic curve of the output signal from the second acceleration detector of FIG. 2.

FIG. 5 shows a modification of the circuit of the second acceleration detector 9 of FIG. 2 which assures more reliable discrimination of whether the position $\theta$ of the knob 25 is less than $\theta_1$. In this arrangement of the second acceleration detector 9, a fixed resistor 27 is provided between the variable resistor 24 and ground, and a switch 28 which is turned ON/OFF by the operation of the variable resistor 24 is connected in parallel with the fixed resistor 27. The switch 28 is set so as to be OFF when the position $\theta$ of the knob 25 is less than $\theta_1$ and turned ON when the position $\theta$ is not less than $\theta_1$. Consequently, when the position $\theta$ of the knob 25 is varied from the position "L" to the position "H", the level of the second amount signal $A_2$ is changed as shown in FIG. 6.

More specifically, the level of the second amount signal $A_2$ is approximately equal to the level of the d.c. voltage V when the position $\theta$ is between $L_1$ and $\theta_1$. However, when the position $\theta$ reaches $\theta_1$, the switch 28 is turned ON and the level of the second amount signal $A_2$ is suddenly lowered to a level $L_a$ less than $L_1$. After this, as the position $\theta$ is increased, the level of the signal $A_2$ decreases in proportion to the increase of $\theta$.

With a second acceleration detector 9 of the structure shown in FIG. 5, since the level of the second amount signal $A_2$ is changed stepwise, level discrimination of the signal $S_2$ can be assuredly performed in the control unit 26.

What is claimed is:

1. An electronic governor for electronically controlling the speed of an internal combustion engine which is equipped on a vehicle and is selectively used to power the vehicle or a machine associated with the vehicle, the operation of the vehicle being controlled by an accelerator pedal and the operation of the machine being controlled by operation of a speed setting member, said electronic governor comprising:
   means for producing a first signal relating to the amount of depression of the accelerator pedal;
   means for producing a second signal relating to the amount of operation of said speed setting member;
   a discriminating means for discriminating the level of the second signal;
   a producing means responsive to the discrimination by said discrimination means for calculating and outputting a first control signal for controlling the amount of fuel injected in accordance with a first governor characteristic on the basis of the first signal when said discriminated level indicates a non-operation condition of said speed setting member for said machine, or a second control signal for controlling the amount of fuel injected in accordance with a second governor characteristic on the basis of the second signal when said discriminated level indicates an operation condition of said speed setting member for said machine; and actuating means responsive to the output of the producing means for operating a fuel regulating member for the internal combustion engine.

2. An electronic governor as claimed in claim 1 wherein said first governor characteristic is a minimum-maximum speed governor characteristic and said second governor characteristic is an all-speed governor characteristic.

3. An electronic governor as claimed in claim 1 wherein said producing means has a first calculating unit responsive to the first signal for carrying out the calculation for the governor control based on the first governor characteristic, a second calculating unit responsive to the second signal for carrying out the calculation for the governor control based on the second governor characteristic, and a selecting means responsive to the discrimination by said discriminating means for selecting the output of the either the first or second calculating unit.

4. An electronic governor as claimed in claim 1 wherein said producing means has means responsive to the discrimination by said discriminating means for selecting either the first or second signal as an acceleration signal, and means responsive to the selected acceleration signal for calculating and outputting a control signal for controlling the speed of said engine in accordance with a governor characteristic selected in response to the discrimination by the discriminating means.

5. An electronic governor as claimed in claim 1 wherein said second signal is a voltage signal whose level varies in accordance with the amount of operation of said speed setting member.

6. An electronic governor as claimed in claim 5 wherein said discriminating means discriminates whether or not the level of the second signal is more than a predetermined level.

7. An electronic governor as claimed in claim 5 wherein said speed setting member includes a variable resistor.

8. An electronic governor as claimed in claim 7 wherein said variable resistor is connected with a knob for adjusting the setting of said variable resistor.

9. An electronic governor as claimed in claim 5 wherein said speed setting member has a variable resistor, a fixed resistor connected in series with the variable resistor and an ON/OFF switch operated in accordance with whether or not the set position of the variable resistor is beyond a predetermined position, said switch being connected in parallel with the fixed resistor, a d.c. voltage being applied across the series circuit of the variable resistor and fixed resistor, whereby the second signal is produced from the variable resistor in accordance with the operation of the variable resistor.

10. An electronic governor as claimed in claim 9 wherein a stepwise change in the level of the second signal caused by the operation of the ON/OFF switch is detected by said discriminating means.

* * * * *